United States Patent [19]

Takeshima et al.

[11] 4,431,047

[45] Feb. 14, 1984

[54] GAS-VENTING ARRANGEMENT INCORPORATED WITH A MOLD

[75] Inventors: Takahiko Takeshima; Mitsuji Matsui; Tadashi Ueki, all of Ube; Tsuneo Ueno, Shimonoseki, all of Japan

[73] Assignee: Ube Industries, Ltd., Japan

[21] Appl. No.: 188,257

[22] Filed: Sep. 19, 1980

[30] Foreign Application Priority Data

Sep. 27, 1979 [JP] Japan .................................. 54-123167
Mar. 6, 1980 [JP] Japan .................................. 55-27362
Mar. 7, 1980 [JP] Japan .................................. 55-27891

[51] Int. Cl.³ ........................ B22D 17/14; B22D 17/20
[52] U.S. Cl. ..................................... 164/253; 164/305; 164/410; 425/420; 425/812
[58] Field of Search ....................... 164/305, 410, 253; 425/420, 812

[56] References Cited

U.S. PATENT DOCUMENTS

| | | | |
|---|---|---|---|
| 2,785,448 | 3/1957 | Hodler | 164/305 |
| 2,867,869 | 1/1959 | Hodler | 164/305 X |
| 3,349,833 | 10/1967 | Hodler | 164/305 X |
| 3,433,291 | 3/1969 | Hodler | 164/305 |
| 3,855,618 | 5/1975 | Hodler | 164/305 |
| 3,892,508 | 7/1975 | Hodler | 164/305 X |
| 3,991,971 | 11/1976 | Drake | 164/410 X |
| 4,027,726 | 6/1977 | Hodler | 164/305 |
| 4,239,080 | 12/1980 | Hodler | 164/305 |

FOREIGN PATENT DOCUMENTS

| | | |
|---|---|---|
| 2248282 | 4/1974 | Fed. Rep. of Germany . |
| 2249417 | 4/1974 | Fed. Rep. of Germany . |
| 2433139 | 1/1976 | Fed. Rep. of Germany ...... 164/305 |
| 2751431 | 5/1979 | Fed. Rep. of Germany . |
| 51-86021 | 7/1976 | Japan .................................. 164/305 |
| 52-23771 | 6/1977 | Japan . |
| 306274 | 3/1955 | Switzerland . |
| 547138 | 3/1974 | Switzerland . |
| 1008610 | 10/1965 | United Kingdom ................ 164/305 |

*Primary Examiner*—Gus T. Hampilos
*Assistant Examiner*—J. Reed. Batten, Jr.
*Attorney, Agent, or Firm*—Finnegan, Henderson, Farabow, Garrett & Dunner

[57] ABSTRACT

An arrangement incorporated with a mold for use in a die casting machine or an injection mold machine comprising: a gas vent passage formed in the mold communicating with a cavity of the mold; two symmetrical by-pass passages branched from the gas vent passage; a gas discharge passage communicating with the outside of the mold; and valve means including a valve chamber formed in the mold having a valve located therein and communicating with the above-mentioned passages. The valve in a first position cooperates with the valve chamber to prevent the gas vent passage from communicating with the gas discharge passage, but prevents both the gas vent passage and the by-pass passages from communicating with the gas discharge passage when in a second position. A portion of the melt forced to flow from the cavity through the gas vent passage upon impingement of that portion of the melt against the valve drives the valve from the first position to the second position before any of the melt forced to flow through the by-pass passages reaches the valve chamber.

23 Claims, 35 Drawing Figures

Fig. 3A  Fig. 3B  Fig. 3C
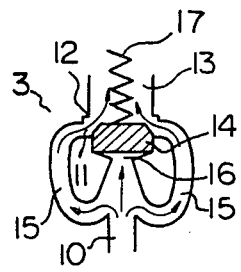
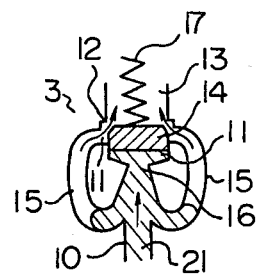
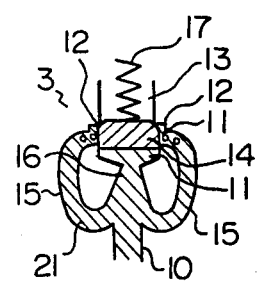
Fig. 3D
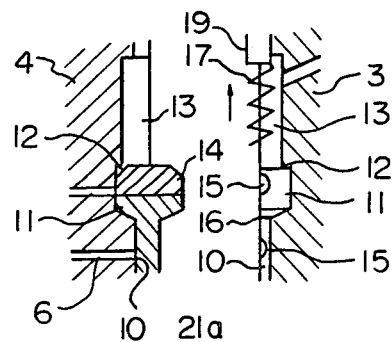

Fig. 4
Fig. 5
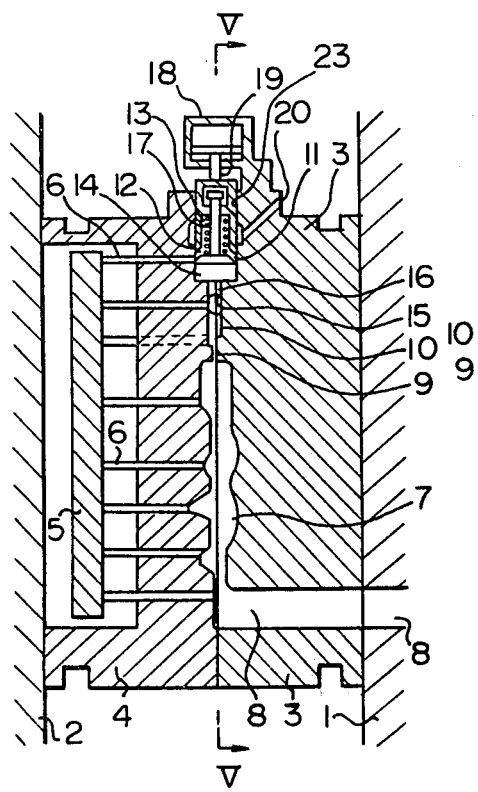
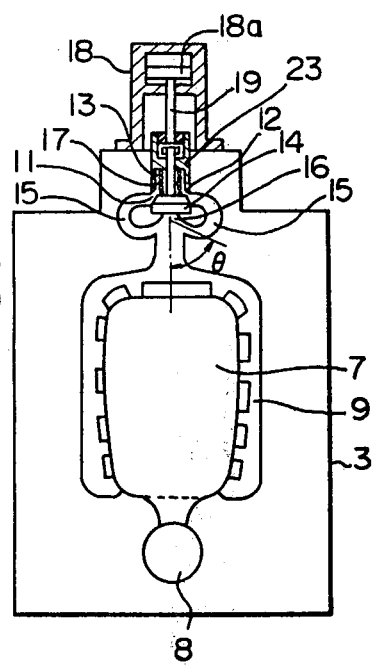

Fig.6A  Fig.6B  Fig.6C
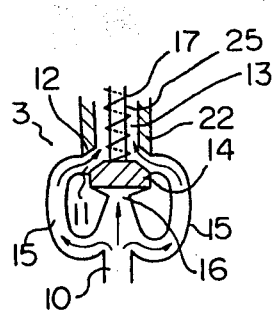 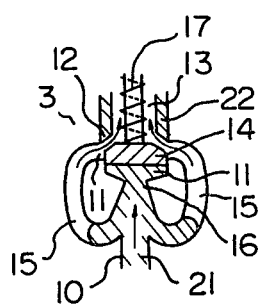 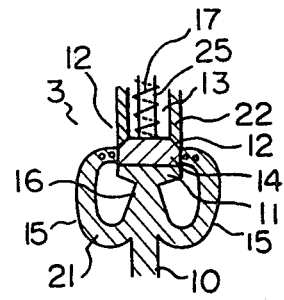
Fig.6D
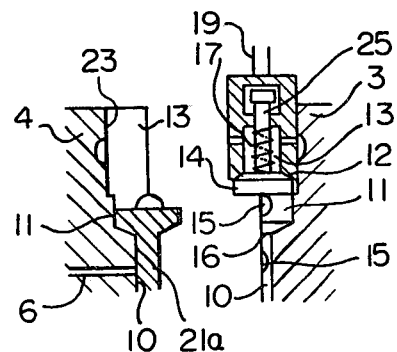

GAS-VENTING ARRANGEMENT INCORPORATED WITH A MOLD

BACKGROUND OF THE INVENTION

The present invention relates to a gas-venting arrangement incorporated with a mold for use in a molding machine, such as a die casting machine or an injection molding machine.

The die casting method has heretofore been used widely as the molding method for manufacturing large quantities of precision products. However, this method is often unsuitable for preparing high quality products for which the absence of voids in the interior of the product is required. The reason is that since a molten metal or melt is injected at a high speed under a high pressure into the mold cavity, gases are not sufficiently vented from the mold cavity but are mingled with the molten metal therein and often left in the product. As means for overcoming the above-mentioned disadvantage, there has been proposed a pore-free die casting method in which the atmosphere of the interior of the mold cavity is replaced by an active gas and the active gas is combined with the molten metal, and thus stabilized, or a method in which the pressure is reduced. These methods, however, cannot ordinarily be adopted.

The inventors examined the relation between the area of the air vent from the mold cavity and the value of the specific gravity of the cast product in a model die casting machine, and it was found that the value of the specific gravity of the cast product increase with an increase in the area of the air vent. However, the number of air vents is limited by the size of the cast product, and in order to prevent the molten metal from passing through the air vent, it is not allowable to increase the diameter of the air vent beyond about 0.1 mm.

It is, therefore, a primary object of the present invention to provide a gas-venting arrangement incorporated with a mold, in which a large quantity of gases can be vented despite the above-mentioned limitations of the size of the cast product or the structure of the mold, and a high quality product can be obtained while preventing inclusion of the gases therein, which inclusion would cause formation of voids in the product.

Another object of the present invention is to provide a gas-venting arrangement incorporated with a mold overcoming the above-mentioned disadvantages, which has a simple construction and serves the function of discharging gases smoothly from the mold during a die casting or injection operation, while the amount of molten metal forced to flow out of the mold cavity is drastically reduced.

According to the present invention, there is provided a gas-venting arrangement incorporated with a mold for use in a die casting machine or an injection mold machine. The mold consists of stationary and movable mold halves, both defining a cavity to be filed with a molten metal. The gas-venting arrangement comprises: a gas vent passage formed in the mold to communicate with the cavity; at least one by-pass passage branched from the gas vent passage, formed in the mold; a gas discharge passage formed in the mold to communicate with the outside of the mold; and valve means, including a movable valve confronting the gas vent passage and a valve chamber having a valve seat formed in the mold, for opening and closing the gas vent passage, the by-pass passage, and the gas discharge passage in such a manner that the valve cooperates with the valve chamber to prevent the gas vent passage from communicating with the gas discharge passage, while allowing the by-pass passage to communicate with the gas discharge passage when the valve is in a first position within the valve chamber, and to prevent the by-pass passage and the gas vent passage from communicating with the gas discharge passage when the valve is in a second position within the valve chamber. The by-pass passage is designed as a detour from the gas vent passage to the valve chamber. In the above arrangement, the valve is forced to move from the first position to the second position by a part of the melt forced to flow out of the cavity and through the gas vent passage upon impingement of the melt part against the valve, before a part of the melt part flowing through the by-pass passage reaches the valve chamber. The cavity, the gas vent passage, the by-pass passage, and at least a forward portion of the valve chamber communicating with the gas vent passage have cross-sections which are parallel to the axis of the mold, the shape of each cross-section being defined by both mold halves. Preferably, the gas-venting arrangement further comprises means for elastically urging the valve against the mold so that the valve is maintained in the first position before the impingement of the melt against the valve. The valve means and the urging means may be located so that they have a common axis perpendicular to the axis of the mold. Alternatively, they have a common axis parallel to the axis of the mold. In both cases, preferably the gas vent passage and the by-pass passage may lie on a plane perpendicular to the axis of the mold.

With respect to the movement of the movable valve, the valve may be mounted in the valve chamber for axial movement and the valve means may be designed so that the valve slidably moves from the first position to the second position along the axis of the valve chamber. Alternatively, the valve may be pivoted so as to rotate about a pivotal axis and the valve means may be designed so that the valve is rotated from the first position to the second position.

The gas-venting arrangement is preferably provided with a hydraulic cylinder for actuating a piston which is connected to the valve means or the urging means so that the valve or the urging means is moved with the piston as needed.

A gas evacuation means such as a suction cylinder or vacuum tank is preferably provided in such an arrangement so that an inlet of the evacuation means communicates with the outlet of the gas discharge passage. The operation of the evacuation means may be synchronized with the injection operation.

BRIEF DESCRIPTION OF THE DRAWINGS

Other features and advantages of the present invention can be more fully understood from the following detailed description with reference to the accompanying drawings in which:

FIGS. 3A, 3B and 3C are diagrams illustrating the operation of a slide valve portion illustrated in FIG. 2 during the injection operation;

FIG. 3D is a diagram illustrating the state of the slide valve portion illustrated in FIG. 2 after the injection operation;

FIG. 4 is a longitudinal section view illustrating a second embodiment of the present invention, corresponding to FIG. 1;

FIG. 5 is a view taken along line V—V in FIG. 4, corresponding to FIG. 2;

FIGS. 6A, 6B and 6C are diagrams illustrating the operation of the slide valve portion illustrated in FIG. 5 during the injection operation, corresponding to FIGS. 3A through 3C;

FIG. 6D is a diagram illustrating a state of the slide valve portion illustrated in FIG. 5 after the injection operation, corresponding to FIG. 3D;

DESCRIPTION OF THE PREFERRED EMBODIMENTS

Figure 1:
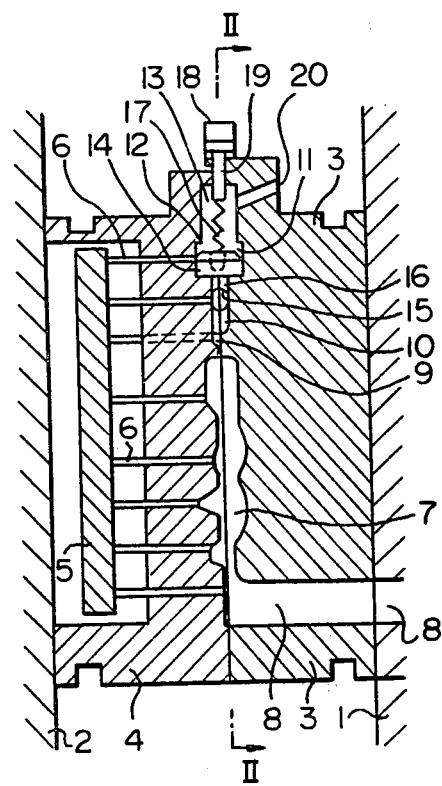
FIG. 1 is a longitudinal section view illustrating a first embodiment of the present invention.
Figure 2:
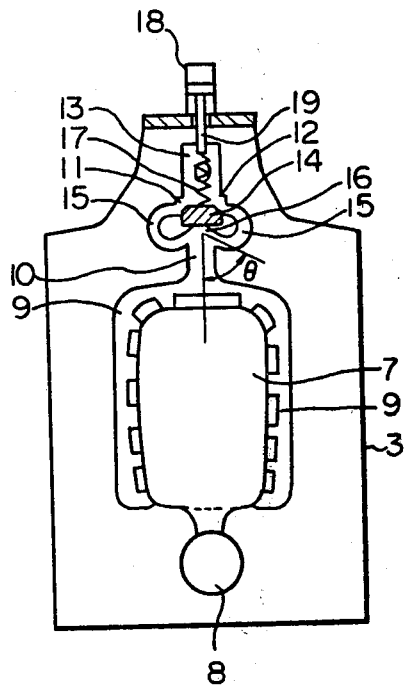
FIG. 2 is a view taken along line II—II in FIG. 1.

In a first embodiment of the invention illustrated in FIGS. 1 and 2, reference numerals 1 and 2 represent stationary and movable platens, respectively. A mold is shown consisting of a stationary mold half 3 and a movable mold half 4. The parting faces of mold halves 3,4 are perpendicular to the axis of the mold shown. A cavity 7 to be filled with a melt is defined by the mold halves 3 and 4. The mold is provided with a push plate 5 and push pins 6. A molten metal casting hole 8 is formed in the mold to communicate with the cavity 7. A shallow but wide groove is formed in the movable mold half 4 in an area about the periphery of the cavity 7. The shallow groove and a flat parting face of the stationary mold half 3 facing the groove define a thin gas vent passage 9 in the mold. An additional gas vent passage 10 connected to the top end of the thin gas vent passage 9 and extending upwardly or rearwardly is formed in the mold. The additional gas vent passage 10 lies on the parting faces of the two mold halves 3 and 4. The cross-section of gas vent passage 10 taken parallel to the axis of the mold is defined by the two mold halves 3 and 4. At the opposite end of the gas vent passage 10 from the gas vent passage of a valve chamber 11, a valve seat 12, and a gas discharge passage 13 having an outlet 20 opening to the outside of the mold are formed in the mold arranged as shown on the parting faces of the two mold halves 3 and 4. A slide valve 14 capable of sliding in the vertical direction is disposed in the valve chamber 11. The valve 14 has a disc-shape, and the periphery of the upper end of the valve 14 is tapered. Two symmetrical by-pass passages 15 detouring around the valve 14 are formed to extend from the gas vent passage 10 to a portion of valve chamber 11 close to the valve seat 12. An intersecting angle $\theta$ formed by the gas vent passage 10 and the inlet portion of each by-pass passage 15 branching therefrom is an acute angle or a right angle. That is, the angle $\theta$ between the gas vent passage 10 and each of the by-pass passages 15 at a point where each of the by-pass passages 15 is branched from the gas vent passage 10 is not more than 90°. A mouth portion 16 of the gas vent passage 10 facing the valve chamber 12 is narrowed like a nozzle. A coil spring 17 is disposed in the gas discharge passage 13 and a hydraulic cylinder 18 for actuating a piston rod 19 connected to the spring 17 is secured to the top of the stationary mold half 3. The valve 14 is urged against the lower end or forward end of the valve chamber 11 by the spring 17.

The operation of the gas-venting arrangement incorporated with the mold will now be described. When mold clamping is carried out in the state where the slide valve 14 is located in the valve chamber 11, as illustrated in FIGS. 1 and 2, the valve 14 is pressed downwardly or forwardly by the actions of the cylinder 18 and the coil spring 17 so that valve 14 abuts against the forward end of the valve chamber 11 and each of the by-pass passages 15 communicates with the upper or rear portion of the valve chamber 11. In this state, the gas discharge passage 13 communicates with the by-pass passages 15 through the valve chamber 11.

In the above state, when a molten metal or melt is flown into the cavity 7 from the casting hole 8, the gases in the cavity 7 are passed through the gas vent passage 9, the additional gas vent passage 10, the by-pass passages 15, the upper portion of the valve chamber 11 and the gas discharge passage 13, and are discharged from the outlet 20. During the period while a melt 21 is being charged into the cavity 7, as illustrated in FIG. 3A, the slide valve 14 is maintained pressed to the lower portion of the valve chamber 11, and a large quantity of the gases is vented through the by-pass passages 15 as indicated by arrows in FIG. 3A.

When injection of the melt 21 into the cavity 7 is substantially completed, a part of the melt 21 rises in the gas vent passage 10 and impinges against the lower or forward face of the valve 14, with the result that the valve 14 is pushed up against the coil spring 17 by the melt 21, and another part of the melt 21 starts intruding into the by-pass passages 15. The state at this point is illustrated in FIG. 3B.

The slide valve 14 closes the by-pass passages 15 when the melt 21 pushes upward and the flow of the melt 21 therein is stopped. At this point, the gases which have passed through the by-pass passages 15 are substantially vented leaving only a slight amount of the gases in the vicinity of the valve seat 12. These residual gases have no bad influences on the cast product in cavity 7. The state at this point is illustrated in FIG. 3C.

When the casting or injection operation is completed, the cylinder 18 is operated to lift coil spring 17 away from slide valve 14, and then the mold opening operation is carried out. The state at this point is illustrated in FIG. 3D. Subsequently, the cast product is removed from cavity 7 of the mold by the operation of the push pins 6, and simultaneously, solidified metal 21a in the gas vent passage 10, the lower or forward portion of the valve chamber 11, and by-pass passages 15 as well as valve 14 are removed together.

The present invention utilizes the difference between the specific gravities of the gases and the molten metal (for example, the ratio of the specific gravity of air to that of molten aluminum is about 1/2000), and also, the disparity of the force of inertia arising in each material owing to this difference in specific gravities.

In order to prevent the molten metal 21 rising in the gas vent passage 10 from intruding directly into the by-pass passages 15, and also, to prevent the melt 21 from passing between the valve 14 and the valve seat 12 before the valve 14 is moved rearwardly, the angle $\theta$ formed by the gas vent passage 10 and the inlet portion of each of the by-pass passages 15 is adjusted to be an acute angle or a right angle. Preferably, the angle $\theta$ is an acute angle.

At the start of each casting, the slide valve 14 is set in a split half of the valve chamber 11 in the stationary mold half 3, and after the slide valve 14 is pressed downwardly in the lower portion of the valve chamber 11, the mold is closed. When the slide valve 14 is formed of a material different from the molten metal 21, after withdrawal of the cast product, the slide valve 14 is separated from the portion of the solidified metal 21a present in the vicinity thereof, after which it may be reused. When the valve 14 is formed of the same material as the molten metal 21, the used valve 14 is either thrown away or it may be fused together with the portion of the solidified metal 21a present in the vicinity of the cast product, such as a sprue and flashes or fins, in order to produce a molten metal for future casting. When the die casting operation is carried out by using the gas-venting arrangement of the present invention, a slide valve 14 of the same material as the molten metal 21 can be prepared by said die casting operation using a part of the mold of the die casting machine.

In the foregoing embodiment, at each casting operation, the valve 14 is set in the valve chamber 11. This valve 14 may be changed to a permanent valve as in a second embodiment described hereinafter.

The second embodiment of the invention is illustrated in FIGS. 4, 5, 6A, 6B, 6C, 6D and 7, in which the same reference numerals as those used with reference to the first embodiment represent the substantially same elements or members. In the second embodiment, the slide valve 14 has a rearward or upward extension 25. A piston rod 19 integrated at one end thereof with a piston 18a of cylinder 18 has a spool or cylindrical slide base 22 connected to its opposite, formed end. The spool 22 is arranged so that it can slide in a vertical hole 23 formed in the mold. The hole 23 consists of a vertical semi-circular groove formed on the stationary mold half 3 and a vertical semi-circular groove formed in the movable mold half 4. As is apparent from FIG. 7, the spool 22 has a forward portion having a valve seat 12 and two outlets 22a and 22b, a rear portion connected to the piston rod 19, and an intermediate constricted portion therebetween. The rear portion of the spool 22 and the piston rod 19 form a chamber 24. The forward portion of the spool 22 has a gas discharge hole 13 and a valve seat 12. The valve extension 25 has a nut 26 at its rearward end portion extending slidably into the interior of the chamber 24. A circumferential groove 20C is formed on the inner surface of the hole 23 to communicate with the gas discharge outlet 20. When the valve 14 abuts against the forward end of the valve chamber 11, the outlets 22a and 22b are in engagement with the groove 20C so as to connect gas discharge hole 13 to the outlet 20.

In this embodiment, the piston rod 19 is raised up to weaken the force of the coil spring 17, and mold clamping is performed in a state where the slide valve 14 is slightly lifted up from the forward end portion of the valve chamber 11. Subsequently, the piston rod 19 is brought down so that the valve 14 is urged against the forward end of the valve chamber 11 by the coil spring 17. In this state, the die casting operation is initiated, and while the gas is being vented from the interior of the mold in the same manner as described above, the die casting operation is conducted. When the die casting operation is completed, the piston rod 19 is raised up to lift the spool 22 and the slide valve 14, and then the mold is opened as shown in FIG. 6D. In this embodiment, the slide valve 14 need not be changed with each casting operation.

In the foregoing embodiments, if the gases are forcefully extruded from the gas discharge outlet 20, the gas venting operation can be performed effectively. In a case where suction of the gas from the gas discharge outlet 20 is carried out synchronously with the injection operation, for example, an evacuation device incorporated with a die casting machine and mounted on a machine bore 27, as illustrated in FIG. 8 may be adopted.

Figure 8:
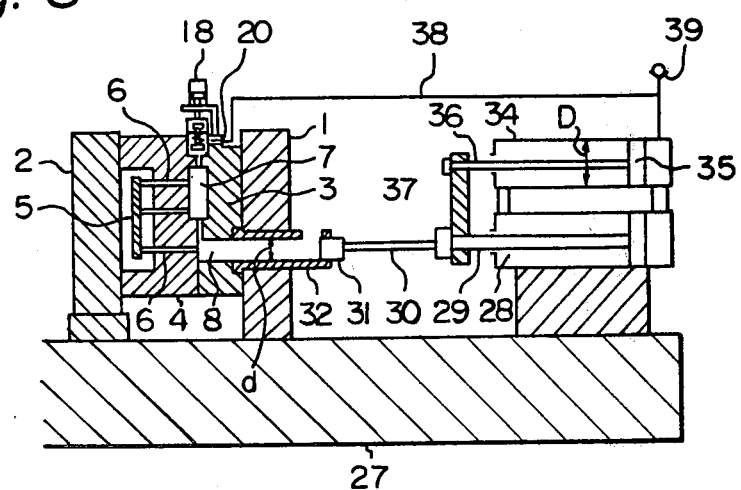
FIG. 8 is a longitudinal section view illustrating a third embodiment of the present invention.

In FIG. 8, the same reference numerals as those used in FIG. 4 represent the same elements or members. Referring to FIG. 8, a suction cylinder 34 is disposed above a hydraulic injection cylinder 28 in parallel thereto. The top end portion of a piston rod 36 integrated with a piston 35 of the suction cylinder 34 is connected integrally to the top end portion of a piston rod 29 of the injection cylinder 28 with a bracket 37, so that both the piston rod 29 and 36 can move simultaneously. The gas discharge outlet 20 is connected to the head end side of the suction cylinder 34 through a conduit pipe 38. Reference numeral 39 represents a non-return valve. An inner diameter D of the suction cylinder 34 is made larger than the inner diameter d of a casting sleeve 32 wherein a plunger tip 31 integrated with an injection plunger 30 and piston rod 29 is slidable. By this arrangement, a subatmospheric pressure is produced in the cavity 7 at the casting step, whereby gas-venting is accomplished very effectively. Reduction of the output power of the injection cylinder 28 by the suction cylinder 34 is very small, so that the operation of the injection cylinder 28 is not substantially influenced thereby.

Figure 7:
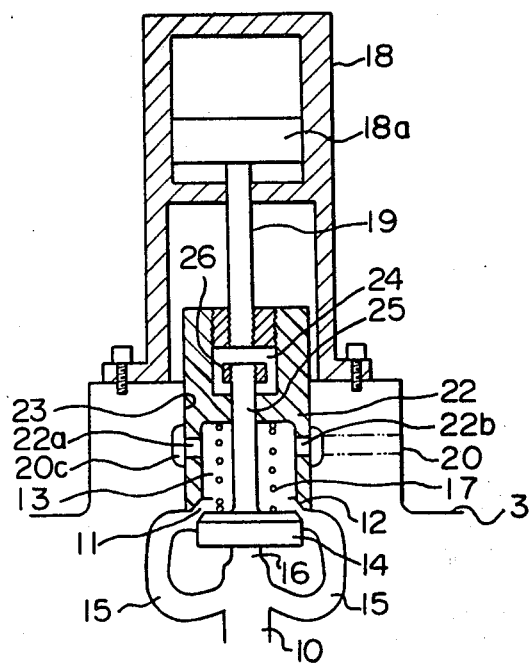
FIG. 7 is an enlarged sectional view of a portion of FIG. 5.
Figure 9:
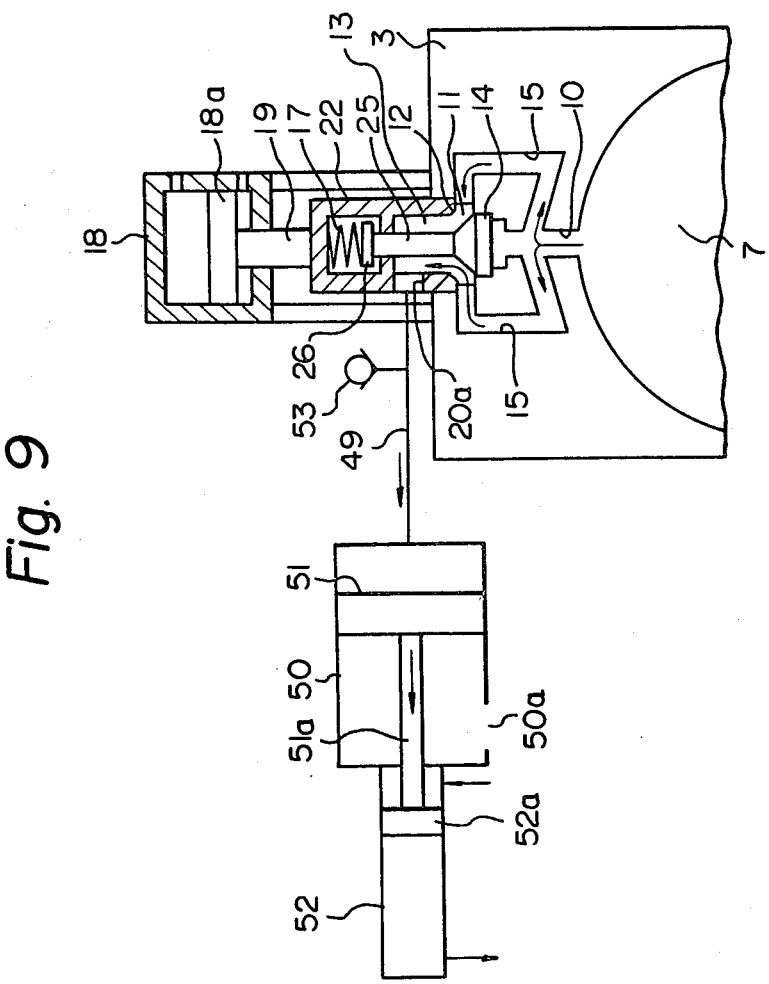
FIG. 9 is a longitudinal section view partially in diagram form illustrating a portion of a fourth embodiment of the present invention, which portion corresponds to a portion of the embodiment illustrated in FIG. 8.
Figure 10:
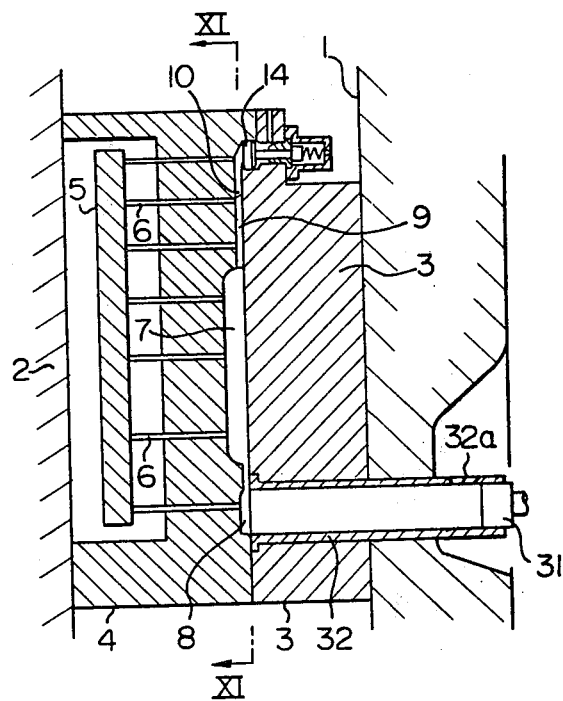
FIG. 10 is a longitudinal section view illustrating a fifth embodiment of the present invention.
Figure 11:
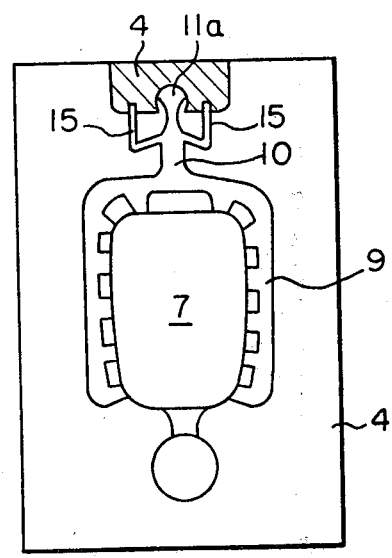
FIG. 11 is a view taken along line XI—XI in FIG. 10.

FIG. 9 illustrates a fourth embodiment of the present invention, which is a combination of a gas-venting arrangement and an evacuation device. In FIG. 9, the same reference numerals as those used in FIG. 7 represent the substantially same elements or members. As to the gas-venting arrangement, a difference between that of FIG. 7 and of FIG. 9 exists in the location of the coil spring 17. In the arrangement of FIG. 9, the coil spring 17 is located between the rear end of the valve extension 25 and the rear end of the spool 22 in the rear portion of the spool 22 forming a chamber 24. The operation of the valves illustrated in FIG. 7 and FIG. 9 is the same.

The evacuation device of the embodiment of FIG. 9 comprises a suction cylinder 50, a suction piston 51 dividing the suction cylinder 50 into forward and rearward chambers, and a hydraulic cylinder 52 for actuating a piston 52a connected to the suction piston 51 by means of a piston rod 51a. The forward chamber of the suction cylinder 50 communicates with the gas discharge outlet 20a through a line 49, while the rear chamber containing piston 51a has an outlet 50a opening to the outside of the suction cylinder 50. The line 49 is provided with a check valve 53 which opens when the suction piston 51 moves forward and is closed when the suction piston 51 moves rearwardly. The suction operation may be carried out either just before or during the injection operation. The injection operation may be synchronized with the suction operation. Most preferably, the timing of the suction operation is synchronized with that of initiation of a high speed injection.

Alternatively, the evacuation device may comprise a vacuum tank and a vacuum pump. In such a case, the tank communicates with the outlet 20a of the gas discharge passage and with the vacuum pump. The pump is driven just before the injection operation so that the tank and the mold are evacuated.

The embodiments illustrated in FIGS. 10 through 15 relate to gas-venting arrangements having valve means arranged so that the axis of each valve means is parallel to the axis of the mold, while the foregoing embodiments relate to gas-venting arrangements having valve means arranged so that the axis of each of the valve means is perpendicular to the axis of the mold. In FIGS. 10 through 15, the same reference numerals as those used in FIGS. 1 through 9 represent the substantially same elements or members.

In a fifth embodiment shown in FIGS. 10 through 13, an injection plunger 31 is slidably fitted in an injection sleeve 32 mounted in the stationary mold half 3. A molten metal feed opening 32a is formed in the vicinity of the outer end of the sleeve 32. The sleeve 32 is connected to the cavity 7 through the casting hole 8. A gas vent passage 10 communicates with the cavity 7 and with the valve chamber 11 commonly formed on the parting faces of the two mold halves 3 and 4. The valve chamber 11 has an axial line intersecting the gas vent passage 10 at a right angle, and the bottom of the valve chamber 11 has a conical face 11a. A slide valve 14 is slidably fitted in the valve chamber 11. A valve rod 14a of the valve 14 is located on the side of the stationary mold half 3 and extends the length of a through-hole 3a which meets valve chamber 11 at valve seat 12. The valve rod 14a passes outward slidably through a guide block 3A fixed in through-hole 3a. A stopper 14b is secured to the end portion of the valve rod 14a on the outer side of the guide block 3A. A cylindrical housing 3B is secured to the stationary mold 3 by bolts 3C to surround the stopper 14b, and the coil spring 17 is located between the back face of the top end of the housing 3B and the stopper 14b to impart a pressing force to the valve 14. Reference numeral 3b represents an air hole formed at the outer end of the housing 3B.

Figure 12:
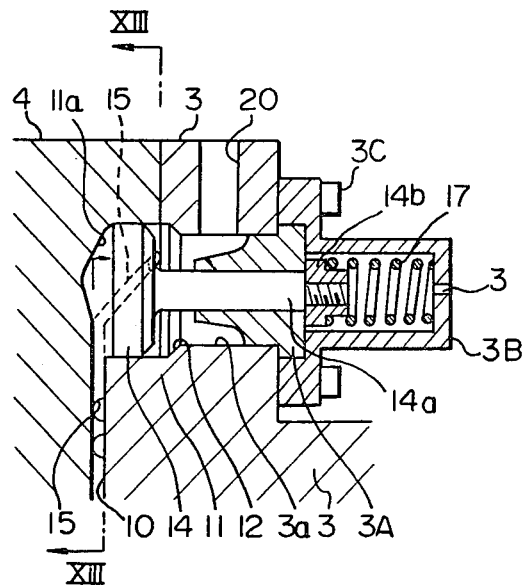
FIG. 12 is an enlarged sectional view illustrating a portion of FIG. 10.
Figure 13:
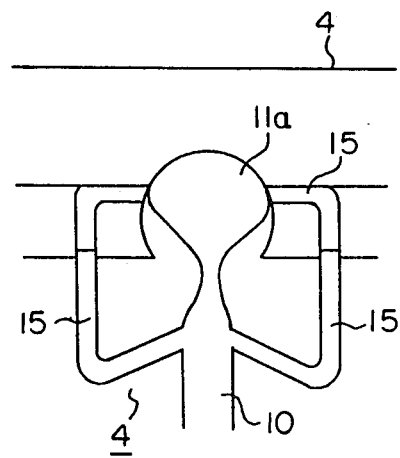
FIG. 13 is a view taken along line XIII—XIII in FIG. 12.

The two symmetrical by-pass passages 15, of the gas vent passage 10 are branched in opposite directions in the vicinity of the valve chamber 11, as illustrated in FIG. 13. The by-pass passages 15 detour on the parting faces of the mold halves from the branching point of the gas vent passage 10 to the slide face of the moving passage of the valve 14 where they are open into the valve chamber 11, as illustrated in FIGS. 12 and 13. The by-pass passages 15 open into to the valve chamber 11 to the side of the valve rod 14a when the valve 14 is in a foreward position where the valve 14 abuts against moveable mold block 4 and the openings of by-pass passages 15 into valve chamber 11 communicate with the through-hole 3a. A gas discharge passage 13 communicating with the gas outlet 20 formed on stationary mold half 3 is therefore defined by the walls of throughhole 3a and the end of guide block 3A inserted thereinto. When the valve 14 is shifted to a rear position such that the valve 14 abuts against the valve seat 12, the openings of by-pass passages 15 into valve chamber 11 are obstructed by the outer peripheral face of the valve 14.

Operation of the embodiment having the structure illustrated in FIGS. 10 through 13 will now be described. First, mold clamping is performed, and then a molten metal is flowed into the casting sleeve 32. When the injection plunger 31 advances through the sleeve 32 the molten metal in the sleeve 32 is charged into the cavity 7 through the casting hole 8 at a high speed, and simultaneously, gases of a small mass in the cavity are guided toward the valve chamber 11 through the gas vent passage 9 surrounding the cavity 7 and then through the additional gas vent passage 10. Since the valve chamber 11 is sealed off from gas vent passage by the valve 14, the gases flow around the valve 14 through the by-pass passages 15 and are discharged to the outer atmosphere through the gas discharge passage 13. Then, the molten metal to be injected intrudes through the gas vent passages 9 and 10. Since the molten metal has a large mass and is intruded at a high speed, the molten metal does not flow into the by-pass passages 15 at first but advances directly toward the interior of the valve chamber 11.

Since the face 11a of the valve chamber is formed to have a conical shape, as pointed out hereinbefore, the melt which impinges against the conical face 11a is reflected thereby, charging the direction of motion of the melt by about 90°, as indicated by an arrow in FIG. 12, causing the melt to impinge forcefully against the end face of the valve 14. Accordingly, the valve 14 is moved at a high speed to the right as viewed in FIG. 12 against the elastic force of the coil spring 17 and then abuts against the valve seat 12 formed on the base end side of the through-hole 3a. As a result the opening of each of the by-passages 15 into the valve chamber 11 is blocked by the peripheral face of the valve 14, and communication of the by-pass passages 15 with the through-hole 3a and the gas discharge outlet 20 is prevented. Accordingly, the gas discharge passage 13 is blocked by the action of the molten metal per se and discharge of the molten metal to the outside of the mold is completely prevented.

Figure 15:
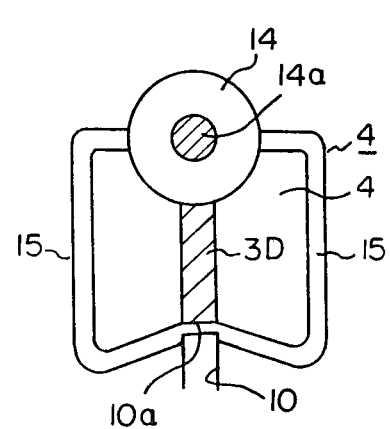
FIG. 15 is a view taken along line XV—XV in FIG. 14, corresponding to FIG. 13.
Figure 14:
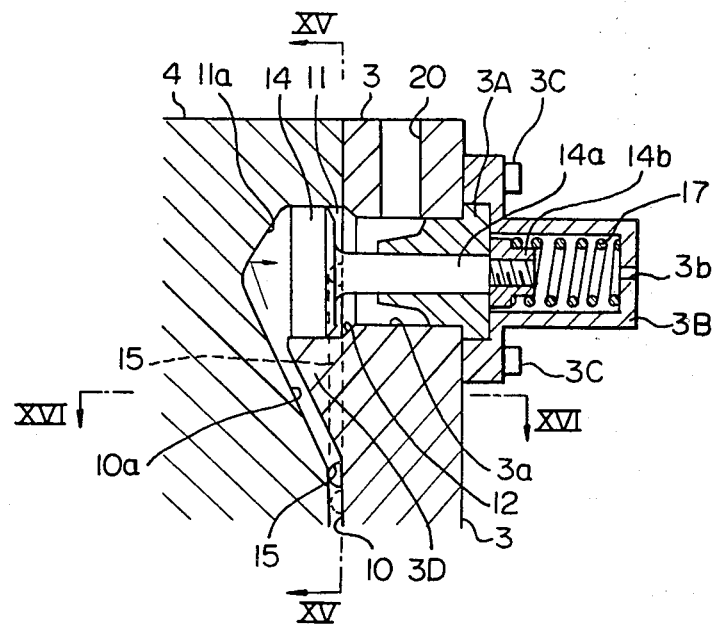
FIG. 14 is a longitudinal section view illustrating a portion of a sixth embodiment of the present invention, corresponding to a portion of the embodiment illustrated in FIG. 10.
Figure 16:
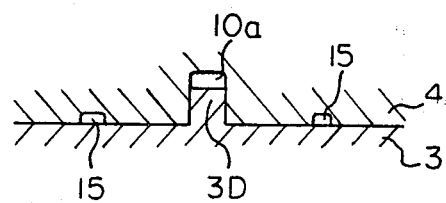
FIG. 16 is a view taken along the line XVI—XVI in FIG. 14.

FIGS. 14 through 16 illustrate a sixth embodiment of the present invention. Members or elements identical with or corresponding to those illustrated in FIGS. 10 through 13 are indicated by the same reference numerals as used in FIGS. 10 through 13, and therefore, explanation of these members is omitted hereinbelow. This sixth embodiment is different from the embodiment shown in FIGS. 10 through 13 in that the by-pass passages 15 are formed to extend linearly along the parting faces of the mold halves 3 and 4 and a passage 10a directed to the valve chamber 11 is additionally formed so that the passage 10a is inclined toward the interear of the movable mold half 4.

As is apparent from FIGS. 14 through 16, the inclined passage 10a is formed to extend along the inclined face of the conical face 11a of the valve chamber 11 at substantially the same inclination angle as that of the face 11a of the valve chamber 11 where inclined passage 10a opens thereinto. A partition wall 3D projected from the stationary mold half 3 is exposed to the outer side of the inclined passage 10a, and this partition wall 3D is intruded into the passage 10a for a predetermined distance, as illustrated in FIG. 16, to adjust the cross sectional shape of the passage 10a to a prescribed size.

In the embodiment of FIGS. 14 through 16 having the above-mentioned structure, as in the embodiment shown in FIGS. 10 through 13, during the injection operation, after the gases having a small mass are first discharged through the by-pass passages 15, then through the through-hole 3a and the gas discharge outlet 20, the melt having a large mass intrudes into the valve chamber 11 through the passage 10a. Then as described with reference to the fifth embodiment shown in FIGS. 10 through 13, the melt impinges against the inclined conical face 11a of the valve chamber 11, the direction of the flow of the melt is changed, as indicated by the arrow in FIG. 14, causing the melt to impinge forcefully against the end face of valve 14 moving valve 14 to the right as viewed in FIG. 14. Valve 14 abuts against the valve seat 12 while the opening of each by-pass passage 15 into valve chamber 11 is blocked by the peripheral face of valve 14. Accordingly, the discharge passage 13 extending to the outside of the mold is automatically blocked by the melt per se, and the melt is prevented from being discharged to the outside of the mold.

In the foregoing fifth and sixth embodiments, after injection molding has been completed and the melt has been cooled and solidified, the mold is opened, and the metal solidified in the gas vent passages 9 and 10, the forward end portion of the valve chamber 11, and the by-pass passages 15 is separated from the stationary mold half 3 while adhering to the movable mold half 4. Then, the push plate 5 is advanced and the solidified metal is separated from the movable mold half 4 together with a formed product in the cavity 7 by means of the push pins 6.

After the mold is opened and the solidified metal in the valve chamber 11 has been removed, the valve 14 is advanced to the left as viewed in FIG. 14 by the elastic force of the coil spring 17 and is ready for the injection operation of a next cycle.

Figure 17:
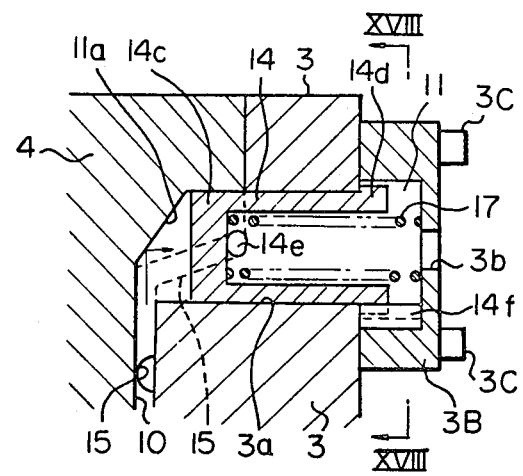
FIG. 17 is a longitudinal section view illustrating a portion of a seventh embodiment of the present invention, corresponding to a portion of the embodiment illustrated in FIG. 10.
Figure 18:
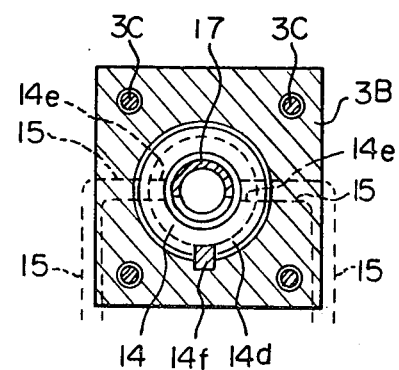
FIG. 18 is a view taken along line XVIII—XVIII in FIG. 17.

FIGS. 17 and 18 illustrate a seventh embodiment of the present invention. In these drawings, the same members as those illustrated in FIGS. 10 through 13 are indicated by the same reference numerals.

In the seventh embodiment, the valve 14 having a cylindrical shape is disposed in the valve chamber 11, and the valve 14 has a bottom wall 14c formed on the front end portion. A flange portion 14d formed on the rear end of the valve 14 catches on the outer face of the stationary mold half 3 when valve 14 slides within through-hole 3a toward the left as viewed in FIG. 17. A hollow block 3B is secured to the outer face of the stationary mold half 3 to partially surround flange portion 14d of the valve 14, and the coil spring 7 is stretched between the inner face of the block 3B and the inner face of the bottom wall 14C of the valve 14 to urge the valve 14 to project into movable mold half 4 from the stationary mold half 3.

Through-holes 14e are formed on the periphery of valve 14 in close proximity to the inner side of the bottom wall 14c. Before the start of injection molding, the through-holes 14e face the openings into the valve chamber 11 of the by-pass passages 15, which branch from the gas vent passage 10. The air hole 3b is formed in the central portion of the block 3B.

In order to engage the through-holes 14e with the open ends of the by-pass passages 15, the valve 14 should be controlled so that it is prevented from rotating. For this purpose, as illustrated in FIG. 17, a key 14f projected from a side portion of the valve 14 is slidably fitted in a key guide groove formed on the block 3B, so that the valve 14 is allowed to move only in the axial direction.

The by-pass passages 15 branch in the vicinity of the valve chamber 11 from the gas vent passge 10, bend toward the stationary mold half 3, and extend along the parting faces of the mold halves 3 and 4.

The block 3B serves both as a base for supporting the coil spring 17 and also as a valve seat instead of the valve seat 12 in the foregoing embodiments. The valve chamber 11 is defined by the through-hole 3a and the block 3B. When the melt pushes the valve 14 against the coil spring 17, the valve 14 reaches the bottom face of the block 3B and abuts against the block 3B. In the foregoing embodiment illustrated in FIG. 12, the housing 3B does not serve as a valve seat.

In the seventh embodiment having the above-mentioned structure, at the time of injection molding, the gases in the cavity 7 are guided through the gas vent passage 10 passing through the by-pass passages 15 to the inner side of the valve 14 by way of through-hole 14e of the valve 14 to be discharged to the outside from the air hole 3b of the block 3B. The hole 3b serves as a gas discharge outlet similar to the outlet 20 illustrated in FIG. 14.

Since the molten metal or melt, which intrudes subsequently to the gases, has a large mass, the melt has a high degree of momentum and advances directly with a great kinetic energy into the forward end portion of the valve chamber 11. Since the bottom of the valve chamber 11 has the inclined face 11a as illustrated in FIG. 17, the melt impinges against the inclined face 11a and is thereby caused to change its direction of flow by about 90°, as indicated by the arrow in FIG. 17. As a result, the melt impinges forcefully against the flat bottom wall 14c of the valve 14 to compress the spring 17 and move the valve 14 to the right in FIG. 17. Accordingly, the through hole 14e no longer oppose the open ends of the by-pass passages 15 to the valve chamber 11, and the open ends of the by-pass passages 15 are blocked by the outer wall of the valve 14. Thus, the passage communicating with the outside of the mold is shut by the action of the melt per se and the melt is prevented from being discharged to the outside.

FIGS. 19 through 24 illustrate other different embodiments of the present invention.

Figure 19:
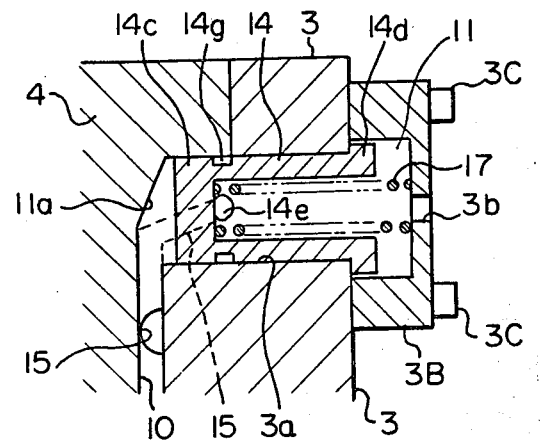
FIGS. 19, 20, 21, 22, 23 and 24 are longitudinally sectional views illustrating each portions of eighth, ninth, tenth, eleventh, twelfth and thirteenth embodiments of the present invention, respectively, corresponding to the same portion of the embodiment illustrated in FIG. 10.

In an eighth embodiment illustrated in FIG. 19, a circumferential groove 14g is formed on the peripheral face of a bottomed cylindrical valve 14 similar to the valve 14 of FIG. 17, and the groove 14g communicates with the through-hole 14e. In the state illustrated in FIG. 19, flange portion 14d of valve 14 abuts against the mold half 3 and the open ends of the by-pass passages 15 to the valve chamber 11 communicate with the groove 14g. In this embodiment, since the position of the valve 14 in the axial direction can be determined by the flange portion 14d alone, no disadvantage is caused if the valve 14 rotates, and rotation-preventing key, such as key 14f illustrated in FIG. 18, need not be provided. Other members and arrangements are the same as in the embodiment illustrated in FIGS. 17 and 18.

Figure 20:
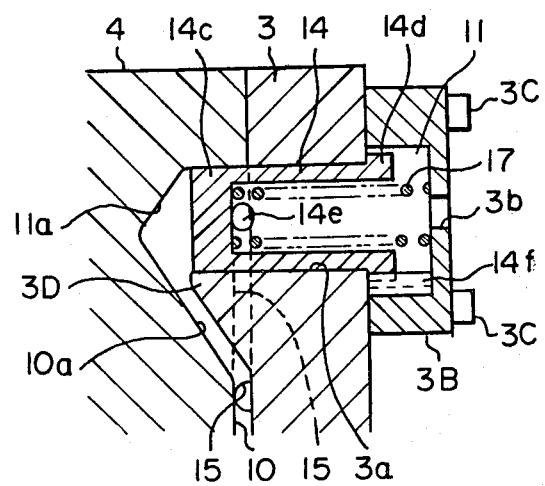

In a ninth embodiment illustrated in FIG. 20, the bottomed cylindrical valve 14 is similar to that of the embodiment of FIGS. 17 and 18, but the by-pass passages 15 extend along the separation face of the movable mold half 4, instead of being bent in a direction perpendicular thereto the, and passage 10a extending from the vertical gas vent passage 10 to the valve chamber 11 is inclined toward the interior of mold 4, as in the sixth embodiment of the invention shown in FIG. 14. The structures of the valve chamber 11 and the passage 10a are the same as those of the embodiment illustrated in FIG. 14, and the partition wall 3D is projected from the stationary mold half 3 to define the inclination of the inclined passage 10a.

Figure 21:
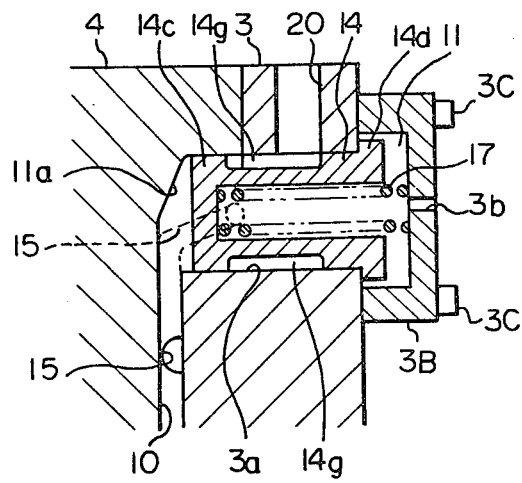

In a tenth embodiment illustrated in FIG. 21, the bottomed cylindrical valve 14 is similar to that of the embodiments of FIGS. 17 and 18, but a wide circumferential groove 14g is formed on the peripheral face of the valve 14 so as to communicate with the gas discharge outlet 20. The by-pass passages 15 communicate with the gas discharge outlet 20 through the groove 14g, when flange portion 14a of the valve 14 abuts against the mold half 3, but the open ends of the by-pass passages 15 are blocked by the outer wall of the valve 14 when the groove 14g does not communicate with the open ends of the by-pass passages 15, that is when the valve abuts against the block 3B.

In the present embodiment, at the time of injection molding, the gases are discharged from the by-pass passages 15 to the outside of the mold through the circumferential groove 14g and the gas discharge outlet 20. The air hole 3b formed on the block 3B does not serve as a gas discharge outlet. A molten metal having a large mass impinges against the inclined face 11a of the valve chamber 11 and the direction of flow of the molten metal is changed, by about 90°, as shown by the arrow in FIG. 21, from the axial direction of the gas vent passage 10 to move the valve 14 to the right in FIG. 21 against the elastic force of the spring 17. The open ends of the by-pass passages 15 are no longer opposite groove 14g, and thus are blocked by the peripheral face of the valve 14, with the result that the passage communicating with the outside is flocked. Accordingly, the molten metal is prevented from being discharged to the outside of the mold.

Figure 22:
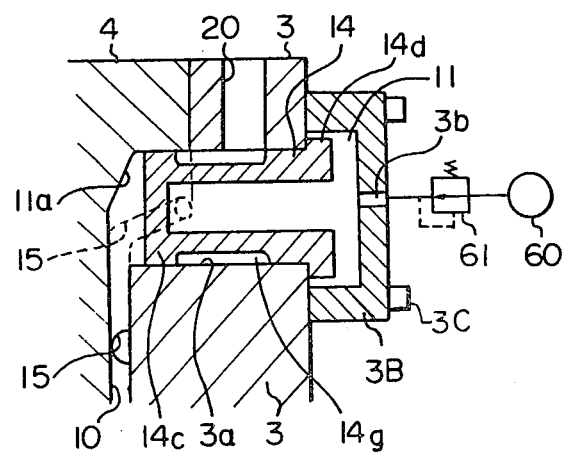

In an eleventh embodiment illustrated in FIG. 22, the bottomed cylindrical valve 14 is similar to that of the embodiment illustrated in FIGS. 17 and 18, but the valve 14 is not biased by the spring 17 as in the foregoing embodiments. More specifically, in the present embodiment, a back pressure is applied to the valve 14 from an air source 60 through a pressure reduction valve 61, and the valve 14 is subjected to this back pressure to resist the gas pressure and abut flange portion 14d of valve 14 against mold half 3.

The embodiment illustrated in FIG. 22 may be modified so that a pressing force from a cylinder is adopted instead of a pressing force produced by air. Furthermore, discharge of the gases and blocking of the melt may be accomplished without any back pressure applied to the valve 14. The reason for this is as follows.

Although the exhaust gases can freely be discharged, when the melt having a large mass is flowed to the valve chamber 11, the valve 14 is immediately moved to the right as seen in FIG. 22 to block the open ends of the by-pass passages 15 and prevent the melt from being discharged to the outside of the mold. At the time when the mold is opened, the metal solidified in the valve chamber 11 pulls the rearwardly moved valve 14 forwardly and resets the valve 14 at the original advanced position.

Figure 23:
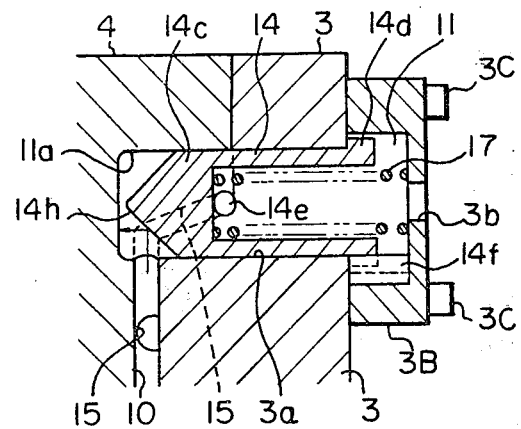

In a twelfth embodiment illustrated in FIG. 23, a conical projection 14h is formed on the forward end of the bottomed cylindrical valve 14, while the bottom walls 14c of the valves 14 illustrated in FIGS. 12, 14, 17, 19, 20, 21 and 22 have flat faces perpendicular to the axial movement of the valve 14, and the valve chamber 11 is formed to have a cylindrical shape having a flat bottom face.

In the twelfth embodiment, gas venting can be performed in the same manner as in the other embodiments explained hereinbefore. More specifically, when the molten metal, having a high degree of momentum, intrudes into the valve chamber 11, said molten metal impinges against a side face of the conical projection 14h of the valve 14, and by the reaction to this impinging, the valve 14 compresses the coil spring 17 and the valve 14 is moved to the right, as seen in FIG. 23. As a result, the open ends of the by-pass passages 15 are blocked by the peripheral face of the valve 14 and the molten metal is prevented from being discharged to the outside of the mold.

Figure 24:
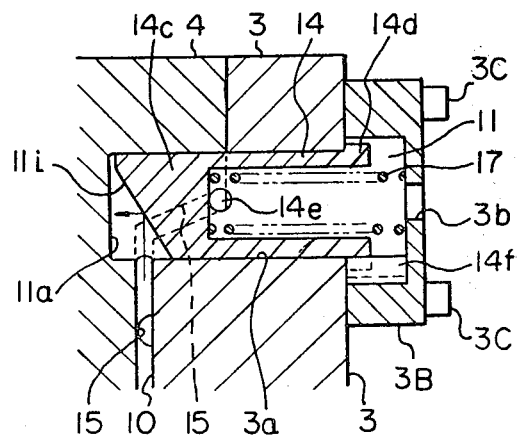

In a thirteenth embodiment illustrated in FIG. 24, an oblique face 11i directed toward the gas vent passage 10 is formed on the bottom wall 14c of the bottomed cylindrical valve 14. In this embodiment, gas venting can be performed in the same manner as in the other embodiments explained hereinbefore. By the action of the melt forcefully impinging against the oblique face 11i, the valve 14 is moved to the right, as seen in FIG. 24, that is rearwardly, while compressing the spring 17, to block the open ends of the by-pass passages 15. Therefore, discharge of the melt to the outside of the mold can be prevented.

The valve means in the gas-venting arrangements incorporated with the molds as illustrated in the above-mentioned embodiments are allowed to be attached to either the stationary mold half 3 or the movable mold half 4.

Figure 25:
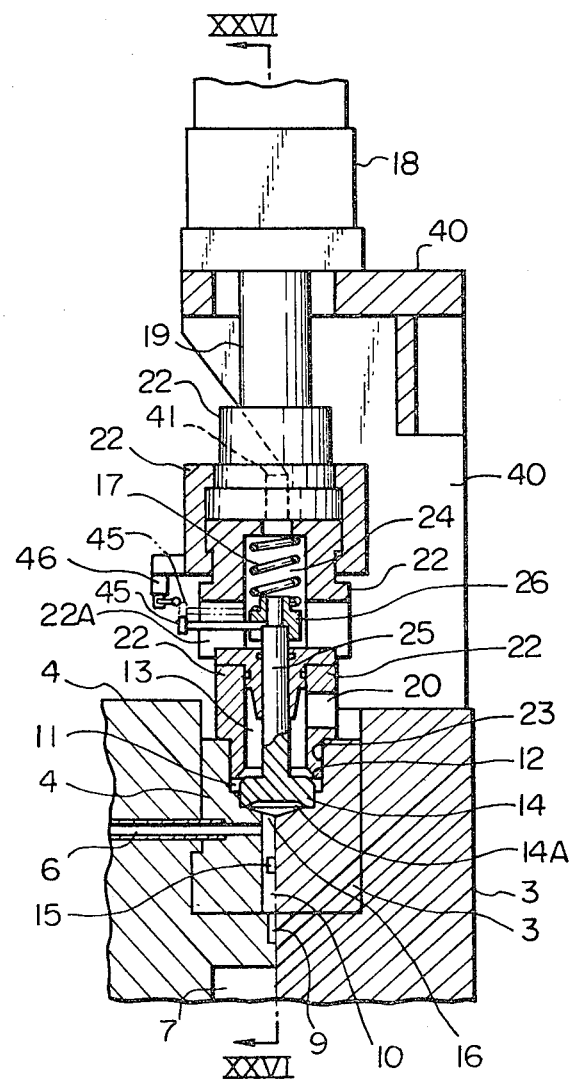
FIG. 25 is a longitudinal section view of a gas-venting arrangement according to the present invention.
Figure 26:
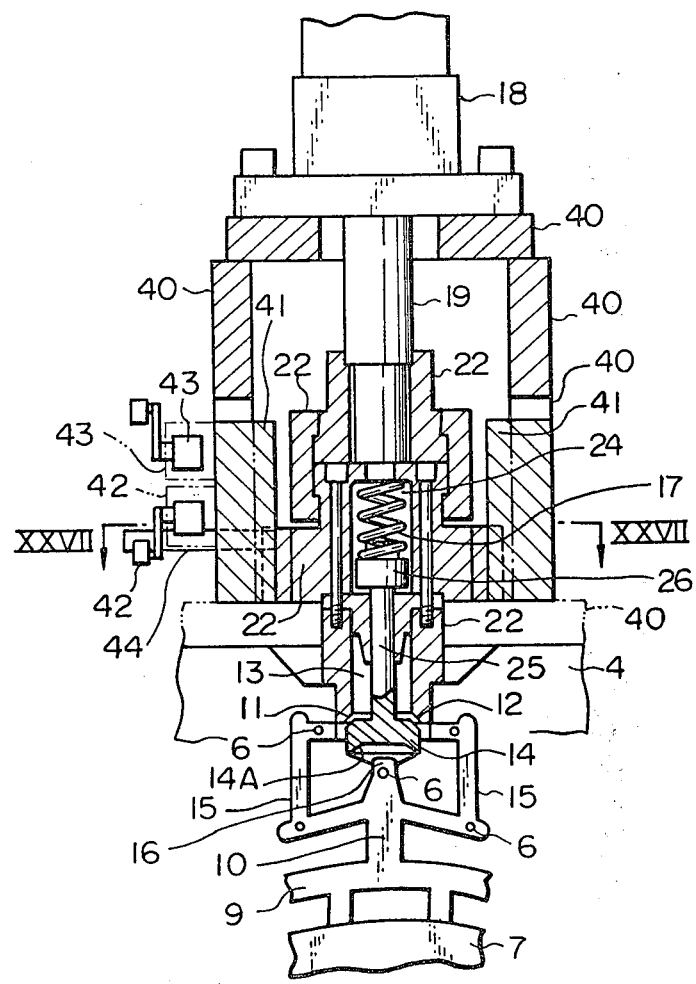
FIG. 26 is a view taken along the line XXVI—XXVI in FIG. 25.
Figure 27:
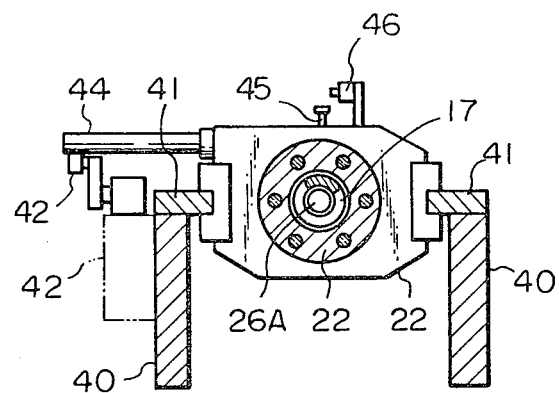
FIG. 27 is a view taken along the line XXVII—XXVII FIG. 26.

FIGS. 25 through 27 illustrate, in detail, an embodiment of the gas-venting arrangement according to the present invention. This gas-venting arrangement has substantially the same structure as that illustrated in FIG. 7. Members or elements identical or corresponding to those illustrated in FIGS. 25 through 27 are indicated by the same reference numerals as used in FIGS. 1 through 7.

The gas-venting arrangement indicated in FIGS. 25 through 27 is mainly different from that of FIG. 7 in the spool structure. That is, the spool 22 in FIGS. 25 through 27 is composed of a plurality of engagable and disengagable parts. The coil spring 17 is located between the rear end of the valve extension 25 and the rear end of the spool 22. This location of the coil spring 17 is the same as that in FIG. 9. The valve 14 is different from that of FIG. 7 or 9 in that it has a recess 14A where the molten metal is received when the metal impinges against the valve 14.

Referring to FIGS. 25 through 27, the hydraulic cylinder 18 is mounted to the stationary mold half 3 by means of a bracket 40 provided with a guide 41, so that the spool 22 is slidably held by the guide 41. Sensors 42 and 43, such as limit switches or non-contact switches, are fixed to the side wall of the bracket 40. The spool 22 is provided with a bar 44 for actuating the sensors 42 and 43, whereby an upper limit and a lower limit of the movement of the spool 22 are determined. Another bar 45 is provided to extend from the enlarged rear end portion 26 of the valve extension 25 to the outside of the spool 22 through a notch or slot 22A of the spool 22, while a sensor 46, such as a limit switch or a non-contact switch, is mounted to the spool 22 so that it is actuated by the bar 45. This arrangement is designed so that, when the bar 45 is not in contact with the sensor 46, the valve 14 is separated from the valve seat 12, and thus, the by-pass passages 15 are communicating with the gas discharge passage 20 through the valve chamber 11. Accordingly, it is confirmed by the information from the sensor 46, whether the valve abuts against the valve seat 12 or not. When it is confirmed that the valve is separated from the valve seat 12, the mold and the gas-venting arrangement incorporated therewith are ready to be subjected to the casting or injection molding operation.

Figure 28:
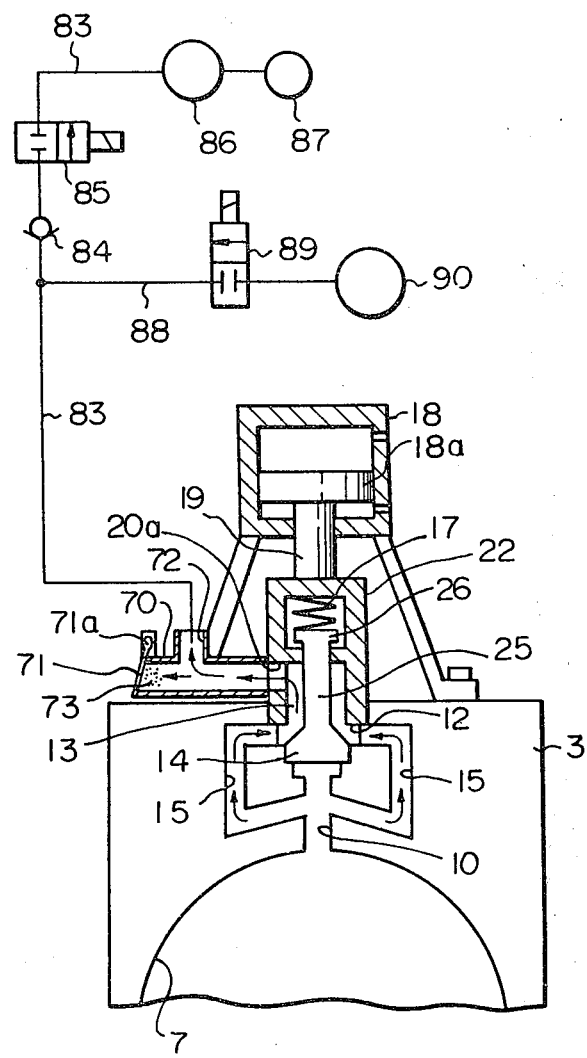
FIG. 28 is a longitudinal section view partially in diagram form illustrating an embodiment of the present invention, which is a modification of the gas-venting arrangement illustrated in FIG. 9.

FIG. 28 illustrates a gas-venting arrangement of the present invention, which is provided with improved gas-discharging means. The structure of the gas-venting arrangement illustrated in FIG. 28 is substantially the same as that illustrated in FIG. 9, except for the gas-discharging portion, and the same numerals in both FIGS. 9 and 28 represent the same members or elements.

Referring to FIG. 28, the illustrated gas-venting arrangement has a gas-discharging portion comprising cylindrical duct 70 communicating, at one end thereof, with the outlet 20a of the gas discharge passage 13. The duct 70 has an upper outlet 72 in its upper side wall and another outlet 73, at the other end, provided with a cover 71 pivotally mounted with a pin 71a to the duct 70 for opening and closing the outlet 73. The outlet surface of the outlet 73 is inclined from a vertical plane which is perpendicular to the axis of the duct 70, so that the cover 71 closes the outlet 73 by its weight. The other outlet 72 of the duct 70 is connected with a conduit 83 which is provided with a check valve 84 and an electro-magnetic valve 85, and communicates with a vacuum pump 87 through a vacuum tank 86. The conduit 83 has a branched conduit 88 which is branched from a point upstream of the check valve 84. The branched conduit 88 communicates with an air source 90 for feeding compressed air through an electro-magnetic valve 89.

When the injection molding operation is carried out, the electro-magnetic valve 85 is actuated according to a signal generated from a limit switch (not shown), and the gases in the cavity 7 are forced to be discharged through the gas-venting arrangement, by the negative pressure, into the vacuum tank 86. When injection molding is repeated many times, metal powders which have been separated from the solidified molten metal are produced in the valve chamber 11, the by-pass passages 15 and the gas-vent passage 10. Such metal powders would be introduced into the vacuum tank 86, if the outlet 20a of the gas discharge passage 13 were connected directly to the conduit 83. However, since the duct 70 is provided as described above, the metal powders go straight toward the cover 71 through the duct 70 without being discharged out of the duct through the upper outlet 72. This is because the mass of the metal powders is great in comparison with that of the gases. The cover 71 is in a closed position when the injection molding is carried out, since the duct is communicated with the vacuum tank, and thus, is subjected to the negative pressure. Therefore, the metal powders are deposited in the duct 70 in the vicinity of the cover 71. Numeral 74 in FIG. 28 represents the deposited metal powders.

After the casting operations of a predetermined number of cycles are completed, the electro-magnetic valves 85 and 89 are closed and opened, respectively. At this stage, if the compressed air is introduced from the air source 90 into the duct 70 through the opened valve 89, the cover 71 is forced open by the compressed air, and thus, the deposited metal powders are purged out of the duct 70 by the compressed air. Simultaneously, the compressed air is introduced into the spool 22, the valve chamber 11, and the by-pass passages 15, since the valve is in the first position where the gas discharge passage 13 is communicated with the by-pass passage 15. In this connection, the metal powders residing on the surface of the valve 14 and in the by-pass passages 15 are also purged. This purging prevents the sealing ability of the valve 14 from being reduced, and further, ensures production of cast products having a high quality.

Figure 29:
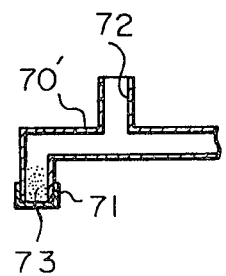
FIG. 29 is a partial section view illustrating another embodiment of the gas-discharging portion of the embodiment of the invention illustrated in FIG. 28.

FIG. 29 illustrates another duct 70' which may be used instead of the duct 70 in FIG. 28.

With respect to the duct 70' in FIG. 29, it has a main horizontal portion having an upper outlet 72 and a vertical end portion bent 90° from the main portion and an end portion which has an open end with a cover 71' which is designed so as to be engagable and disengagable with the open end.

The above-mentioned ducts 70 or 70' serve as a collector of the metal powder 74, even if the outlet is open to the atmosphere.

According to the above-mentioned embodiments of the present invention, the following advantages can be obtained.

1. Since the gas discharge passage is shut by the valve which is directly pressed by a molten metal injected into the mold, said metal having advanced directly into the gas vent passage, the valve is thereby moved in the same direction as the advancing direction of the molten metal, the closing of the valve chamber is performed very quickly and assuredly, and gas venting and prevention of the molten metal from intruding into the valve chamber can be accomplished assuredly and conveniently.

2. Since the gases are sufficiently vented at the injection step, the amount of the gases left in an injection molded product can be drastically reduced, and the running characteristic of the melt and the pressure resistance and air tightness of the injection-molded product can be remarkably improved.

3. Since formation of fins is reduced in the air vent portion around the cavity, removal of fins need not be carried out and the mold is not damaged, with the result that automation of the molding operation can be facilitated and the life of the mold can be prolonged.

4. Since gas venting is sufficiently accomplished, an injection-molded product of a good quality can be obtained under a low injection pressure. Of course, by virtue of this feature, automation of the operation can be facilitated and the life of the mold can be prolonged.

5. Since gas venting is sufficiently accomplished, the allowable ranges of injection conditions can be broadened, and the effects of shortening the time of a trial injection and stabilizing the quality in injection-molded products can be attained. According to the conventional technique, the injection pressure, injection speed, and high speed injection-starting position suitable for the gas-venting operation must be determined prior to each series of casting operations. However, a long time is required for determining these variables, which are then gradually changed during the operation. In contrast, according to the present invention, since gas venting is sufficiently accomplished, the allowable ranges of injection conditions can be broadened remarkably.

6. There has previously been proposed a method in which air is vented from the cavity through a shallow groove formed on the parting face of the mold half by means of a vacuum device. In that method, however, if the amount of air vented from the cavity is small, air is in turn, introduced from the outside of the mold through gaps in the parting faces of the mold, and a vacuum condition is not produced in the cavity. In contrast, according to the present invention, since a large quantity of air is vented, the precision of mating or fitting the parting face of the movable mold half with that of the stationary mold half is not a severe problem. Therefore, if a pressure reduction method is adopted in performing the present invention, the effect can be further enhanced.

7. If a nonporous die casting method where injection is conducted in the cavity with an atmosphere of an active gas, such as oxygen, is adopted in performing the present invention, products of a very high quality can be obtained. In this case, prior to injection of the molten metal, an active gas is introduced into the cavity, from the gas dischare outlet of the gas-venting arrangement of the present invention, and then injection is performed. Alternatively, active gas can be introduced into the cavity also during injection.

8. Remarkable advantages can be obtained when the present invention is applied to die casting of magnesium. In die casting of aluminum there can be adopted a method in which injection is slowly performed to vent the gas from the cavity to the vent portion. However, in the casting of a magnesium alloy, since the solidification speed of the magnesium alloy is very high, low-speed injection is not possible. Instead, soon after the start of the injection operation, the injection speed should be increased to a high level. In the injection operation, a large quantity of the gas contained in the cavity and injection sleeve, which has a volume about 2 times the volume of the cavity, should be vented to the outside of the mold. In die casting of magnesium, since the injection speed should be maintained at a level higher than in die casting of aluminum, inclusion of a relatively large quantity of the gas in an injection-molded product could not be avoided under the prior art. However, when the present invention is adopted, since gas venting is sufficiently performed, even in the case of die casting of magnesium, an injection-molded product free of voids can be obtained easily and assuredly.

9. The present invention can also be applied to hot chamber-type die casting.

10. According to the conventional technique, after the mold is opened, cooling wter or a water-soluble parting agent is sprayed onto the surface of the cavity. When drops of water are left in the mold at the time of mold clamping steam cannot escape, and if an injection is performed in this state, the surface of an injection-molded product is blackened or running of the melt becomes poor, with the result that it becomes impossible to obtain an injection-molded product of high quality. Therefore, mold clamping should be performed after drops of water on the surface of the cavity have been evaporated off by sufficient drying. However, according to the present invention, if hot air is fed into the mold through the gas discharge outlet of the gas venting arrangement at the time of mold clamping, steam in the mold is allowed to escape through the injection sleeve. That is, the steam is forced out of the mold by the hot air introduced from the opening end of the gas discharge passage. This feeding of hot air can be conducted not only at the time of mold clamping, but also at the time of the supply of a melt. Accordingly, if an arrangement is made so that hot air is fed into the cavity through the gas-venting arrangement of the present invention, mold clamping can be accomplished immediately after spraying of the parting agent, and therefore, the operation cycle can be shortened.

11. The gas-venting arrangement can also be used as a permanent means.

What is claimed is:

1. A gas-venting arrangement incorporated with a mold formed of stationary and movable mold halves with parting faces perpendicular to the axis of the mold and together defining a cavity to be filled with a metal melt, said gas venting arrangement comprising:

a. a valve chamber formed in said mold, said valve chamber having an axial extension and including an enlarged forward portion, a constricted rear portion, and a valve seat formed between said forward and rear portions;

b. a gas vent passage formed in said mold connected to said cavity and to a forward end of said forward portion of said valve chamber;

c. a gas discharge passage formed in said mold and opening on an inner side surface of said rear portion of said valve chamber to communicate with the outside of said mold;

d. at least one by-pass passage formed in said mold branching from a point on said gas vent passage to an opening on an inner side surface of said forward portion of said valve chamber;

e. a valve having an axial extension coaxial with said axial extension of said valve chamber and slidably received in said forward portion of said valve chamber for movement between a first position, wherein said valve cooperates with said valve chamber to prevent said gas vent passage from communicating with said gas discharge passage through said forward portion of said valve chamber and to permit said by-pass passage to communicate therewith through said valve chamber, and a second position, wherein said valve rests against said valve seat and cooperates with said valve chamber to prevent both said by-pass passage and said gas vent passage from communicating with said gas discharge passage through said valve chamber; and f. urging means for biasing said valve into said first position and permitting movement of said valve into said second position under axial impingement against said valve of a portion of said melt injected into said cavity and forced to flow through said gas vent passage into said forward portion of said valve chamber, said urging means being adjusted and said by-pass passage being dimensioned and configured to permit movement of said valve into said second position before a second portion of said melt reaches said forward portion of said valve chamber through said by-pass passage.

2. A gas-venting arrangement incorporated with a mold, as claimed in claim 1, wherein said cavity, said gas vent passage, and said by-pass passage communicating with said gas vent passage have cross sections parallel to the axis of said mold and defined by said mold halves.

3. A gas-venting arrangement incorporated with a mold, as claimed in claim 2, also including an additional by-pass passage branched from said gas vent passage and opening on said valve chamber, said by-pass passages branching from said gas vent passage at a point in the vicinity of said forward portion of said valve chamber and symmetrically formed in said mold, each of said by-pass passages having a cross section parallel to the axis of said mold and defined by said mold halves, each of said by-pass passages forming an angle with said gas vent passage at said point where said by-pass passages branch from said gas vent passage, said angle being not more than 90 degrees.

4. A gas-venting arrangement incorporated with a mold, as claimed in claim 2 further comprising a hydraulic cylinder/mounted in said stationary mold half/for actuating a piston, wherein said valve is of a disc form, and said urging means comprises a coil spring which has a forward free end for abutting against a rear end of said disc valve and said coil spring has a rear end connected to said piston, said hydraulic cylinder being operated so that said piston moves simultaneously with said coil spring to a forward position where said valve is urged against the forward end of said valve chamber by said coil spring, immediately before the injection operation, and then, after the injection operation is completed, said piston moves simultaneously with said coil spring to a rear position, where said coil spring is distanced from said valve.

5. A gas-venting arrangement incorporated with a mold, as claimed in claim 2, further comprising a hydraulic cylinder mounted in said stationary mold half for actuating a piston, wherein a hole is formed in said mold to open on said valve chamber, said valve comprises a disc body and a rearward extension therefrom, and said urging means comprises:

a. a cylindrical base mounted in said hole for an axial movement, said cylindrical base having a forward cylindrical portion on which said gas discharge passage opens, a rear cylindrical portion, and an intermediate constricted cylindrical portion therebetween in which constricted portion said valve extension is slidably disposed; and b. a coil spring disposed within said cylindrical base between said valve and said cylindrical base, said forward base portion having a forward circumferential edge formed so that said valve can be rested on said edge, said valve extension having a free rear end large enough to prevent said valve from being removed forwardly through said intermediate base portion, said piston being connected to said rear base portion so that it is forced to move with said cylindrical base, said urging means, said valve and said hydraulic cylinder being designed so that:

a. when said piston is in a forward position, said valve is in said first position where said cylindrical base abuts against the inner end of said hole;

b. when said valve is in said second position, the forward end of said forward base portion serves as said valve seat of said valve chamber; and c. when said piston is returned from said forward position to a rear position, said intermediate base portion cooperates with said enlarged rear end of said valve extension so as to move said valve rearwardly out of said valve chamber together with said cylindrical base.

6. A gas-venting arrangement incorporated with a mold, as claimed in claim 5, wherein said forward base portion has at least one opening in its side wall, said opening being positioned so that it is located outside of said mold when said cylindrical base abuts against said mold.

7. A gas-venting arrangement incorporated with a mold, as claimed in claim 5, wherein:

a. said coil spring surrounds said valve extension and is located between said valve and said intermediate base portion;

b. said forward base portion has at least one opening in its side wall; and c. said hole has a circumferential groove on its inner surface communicating with said gas discharge passage, said opening of said forward base portion being engaged with said circumferential groove when said valve is in said first position for allowing said gas discharge passage to communicate with said by-pass passage.

8. A gas-venting arrangement incorporated with a mold, as claimed in claim 5 wherein:

a. said coil spring is located between the free rear end of said valve extension and the rear end of said rear base portion;

b. said forward base portion has at least one opening in its side wall; and c. said hole has a circumferential groove on the internal surface thereof communicating with said gas discharge passage, said opening of said forward base portion being engaged with said cimcumferential groove when said valve is in said first position for allowing said gas discharge passage to communicate with said by-pass passage.

9. A gas-venting arrangement incorporated with a mold, as claimed in claim 2, wherein:

a. a hole is formed in said mold to open on said valve chamber at the rear end thereof;

b. said valve consists of a disc body slidably disposed in said valve chamber and a rearward extension therefrom, said valve body abutting against said valve seat when said valve is in said second position, said valve extension being slidably disposed in said hole and having an enlarged rear end which abuts against said mold when said valve is in said first position; and c. said urging means comprises a cylindrical housing mounted to said stationary mold half and a coil spring disposed therein, said housing having a forward end opening communicating with said hole and a rear end supporting said coil spring, said rear end of said valve extension being axially movable in said housing and being urged against said mold by said coil spring, said gas discharge passage opening to the interior of said valve chamber at the rear thereof.

10. A gas-venting arrangement incorporated with a mold, as claimed in any one of claims 2, 3, 4, 5, and 1 wherein said gas vent passage, said valve, said valve chamber, and said urging means have a common axis parallel to the parting faces of said mold halves and perpendicular to the axis of said mold.

11. A gas-venting arrangement incorporated with a mold, as claimed in any one of claims 3, 4, 5, 8, and 1 wherein said valve, said valve chamber and said urging means have a common axis parallel to the axis of said mold.

12. A gas-venting arrangement incorporated with a mold, as claimed in claim 11, wherein the forward end of said valve has a flat face, and the forward end of said valve chamber is defined by a portion of a face of said movable mold half facing said valve, said mold face portion being inclined at an angle to said valve face so that said part of the melt forced to flow through said gas vent passage is directed by said mold face portion to flow toward said valve face.

13. A gas-venting arrangement incorporated with a mold, as claimed in claim 12, wherin each of said by-pass passages is located in a plane perpendicular to the axis of said mold, and said gas vent passage is inclined at an angle to said plane.

14. A gas-venting arrangement incorporated with a mold, as claimed in claim 12, wherein said gas vent passage is located in a plane perpendicular to the axis of said mold, and each said by-pass passage is inclined at an angle to said plane.

15. A gas-venting arrangement incorporated with a mold, as claimed in claim 11, wherein the forward end of said valve has a conical face, and the forward end of said valve chamber is defined by a portion of a face of said movable mold half facing said valve, said mold face portion being parallel to a plane perpendicular to the axis of said mold, said gas vent passage being positioned parallel to said plane and opening on the forward end of said valve chamber so that said part of the melt forced to flow through said gas vent passage flows into said valve chamber parallel said mold face portion, and said by-pass passage is inclined at an angle to said plane.

16. A gas-venting arrangement incorporated with a mold, as claimed in claim 11, wherein the forward end of said valve has a flat face, and the forward end of said valve chamber is defined by a portion of a face of said movable mold half facing said valve, said mold face portion being parallel to a plane perpendicular to the axis of said mold, said flat valve face being inclined at an angle to said plane, and said gas vent passage being parallel to said plane and opening on the forward end of said valve chamber so that said part of the melt forced to flow through said gas vent passage flows into said valve chamber parallel said mold face portion and collides directly with said inclined flat valve face.

17. A gas-venting arrangement incorporated with a mold, as claimed in claim 4, wherein said disc valve is made of the same material as that of the melt to be cast in said mold.

18. A gas-venting arrangement incorporated with a mold, as claimed in any one of claims 2, 3–9, and 1, further, comprising a gas evacuation device communicating with the outlet of said gas discharge passage, wherein said gas evacuation device is operated to draw gases out of said cavity through said gas vent passage, said by-pass passages, said valve chamber, and said gas discharge passage during the injection operation until said valve moves to said second position.

19. A gas-venting arrangement incorporated with a mold, as claimed in claim 18, wherein said evacuation device comprises a vacuum pump and a vacuum tank communicating with said pump and with the outlet of said gas discharge passage, said pump being actuated so that said tank and said mold are evacuated immediately before the melt is introduced into said cavity.

20. A gas-venting arrangement incorporated with a mold, as claimed in claim 18, wherein said evacuation device comprises a suction cylinder, a suction piston dividing said suction cylinder into forward and rear chambers, and a hydraulic cylinder for actuating said suction piston, said forward chamber communicating with the outlet of said gas discharge passage, said piston being actuated to move rearwardly so that said mold is evacuated immediately before the melt is introduced into said cavity.

21. A gas-venting arrangement incorporated with a mold as claimed in claim 18, further incorporating a casting sleeve communicating with said cavity, a hydraulic injection cylinder, an injection plunger mounted for axial movement in said casting sleeve and actuated by said injection cylinder, wherein said evacuation device comprises a suction cylinder and a suction piston mounted therein for axial movement and dividing said cylinder into forward and rear chambers, said forward chamber communicating with the outlet of said gas discharge passage, said suction piston being connected to said injection plunger to be driven by said hydraulic injection cylinder to move rearwardly simultaneously with said injection plunger during the injection operation, said suction cylinder having an inner diameter larger than that of said casting sleeve.

22. A gas-venting arrangement incorporated with a mold, as claimed in claim 18, further comprising a cylindrical duct having forward and rear opening ends, said forward opening end communicating with the outlet of said gas discharge passage, said duct having a gas outlet in its upper wall between said forward and rear opening ends, said gas outlet communicating with said evacuation device, said rear opening end being provided with a cover for closing and opening said rear opening end to permit purging of metal powder, produced from said melt in the valve portion and deposited in said duct in the vicinity of said rear opening end as needed.

23. A gas-venting arrangement incorporated with a mold formed of stationary and movable mold halves with parting faces perpendicular to the axis of the mold and together defining a cavity to be filled with a metal melt, said gas-venting arrangement comprising:

a. a gas vent passage through which said melt is allowed to flow, said gas vent passage formed in said mold to communicate with said cavity;

b. at least one by-pass passage formed in said mold branching from a point on said gas vent passage;
c. a gas discharge passage formed in said mold to communicate with the outside thereof;
d. valve means including a movable valve having an axial extension and a valve chamber having an axial extension co-axial therewith, said valve chamber formed in said mold and including an enlarged forward portion, a constricted rear portion, and a valve seat between said forward and rear portions, said gas vent passage opening on a forward end of said forward portion of said valve chamber, said by-pass passage detouring from said point on said gas vent passage to an opening on an inner side surface of said forward portion of said valve chamber, said valve being received in said forward portion of said valve chamber slidably in the axial direction, said gas discharge passage opening on an inner side surface of said rear portion of said valve chamber; and
e. means for elastically urging said valve axially forward against said mold to maintain said valve relative to said valve chamber in a first position wherein said valve cooperates with said valve chamber to prevent said gas vent passage from communicating with said gas discharge passage through said forward end of said forward portion of said valve chamber while simultaneously allowing said by-pass passage to communicate with said gas discharge passage through said opening on said inner surface of said forward portion of said valve chamber, said valve being forced to move axially rearwardly against said urging means from said first position to a second position relative said valve chamber resting against said valve seat by axial impingement of a part of said melt forced to flow out of said cavity, through said gas vent passage, and against said valve before another part of said melt reaches said valve chamber through said by-pass passage, said valve when in said second position preventing both said by-pass passage and said gas vent passage from communicating with said gas discharge passage through said forward portion of said valve chamber;

wherein said gas vent passage, said valve, said valve chamber, and said means for urging lie in a common plane which includes the parting face of one of said mold halves.

* * * * *